United States Patent
Mankame et al.

(10) Patent No.: US 12,024,915 B2
(45) Date of Patent: Jul. 2, 2024

(54) INFLATABLE STRUCTURES WITH CHEMICAL REACTION BASED INFLATORS

(71) Applicant: GM GLOBAL TECHNOLOGY OPERATIONS LLC, Detroit, MI (US)

(72) Inventors: Nilesh D. Mankame, Ann Arbor, MI (US); Paul W. Alexander, Ypsilanti, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 369 days.

(21) Appl. No.: 17/583,677

(22) Filed: Jan. 25, 2022

(65) Prior Publication Data

US 2023/0235591 A1   Jul. 27, 2023

(51) Int. Cl.
| | |
|---|---|
| *E04H 15/20* | (2006.01) |
| *B01J 7/00* | (2006.01) |
| *B32B 5/02* | (2006.01) |
| *B32B 27/12* | (2006.01) |
| *B32B 27/28* | (2006.01) |
| *B32B 27/34* | (2006.01) |
| *B32B 27/40* | (2006.01) |

(52) U.S. Cl.
CPC ............... *E04H 15/20* (2013.01); *B01J 7/00* (2013.01); *B32B 5/02* (2013.01); *B32B 27/12* (2013.01); *B32B 27/281* (2013.01); *B32B 27/283* (2013.01); *B32B 27/34* (2013.01); *B32B 27/40* (2013.01); *B32B 2255/02* (2013.01); *B32B 2262/0253* (2013.01); *B32B 2262/0261* (2013.01); *B32B 2262/0276* (2013.01); *B32B 2419/00* (2013.01); *E04H 2015/201* (2013.01); *E04H 2015/206* (2013.01)

(58) Field of Classification Search
CPC .............. E04H 15/20; E04H 2015/201; E04H 2015/206
See application file for complete search history.

(56) References Cited

U.S. PATENT DOCUMENTS

| | | | | |
|---|---|---|---|---|
| 3,458,009 | A | * | 7/1969 | Favors .................... B64D 25/14 193/25 B |
| 3,833,029 | A | * | 9/1974 | Munn ..................... F42B 3/045 441/100 |

(Continued)

*Primary Examiner* — Robert Canfield
(74) *Attorney, Agent, or Firm* — Harness, Dickey & Pierce, P.L.C.

(57) ABSTRACT

A lightweight and portable inflatable assembly includes an inflatable structural component and a chemical reaction based inflator device. The inflatable structural component includes a flexible housing defining a cavity. The inflatable structure is uninflated in a first operational mode and filled with an inflation fluid retained for at least 4 hours in a second operational mode. At least one primary and at least one secondary charge unit are in fluid communication with the cavity. The primary charge unit includes a first gas generant material configured to generate a first predetermined volume of inflation medium for filling the cavity, while the secondary charge unit includes a second gas generant material configured to generate a second predetermined volume of inflation medium for filling the cavity in the second operational mode. The second predetermined volume is ≤about 40% by volume of the first predetermined volume.

20 Claims, 2 Drawing Sheets

(56) References Cited

U.S. PATENT DOCUMENTS

| | | | | |
|---|---|---|---|---|
| 5,397,543 | A | * | 3/1995 | Anderson ................ C06D 5/06 422/165 |
| 5,551,725 | A | * | 9/1996 | Ludwig ................... C06D 5/06 222/3 |
| 5,927,748 | A | | 7/1999 | O'Driscoll |
| 6,314,889 | B1 | * | 11/2001 | Smith ................ B60R 21/2644 280/736 |
| 7,188,567 | B1 | * | 3/2007 | Italiane ................ B60R 21/264 280/736 |
| 8,176,851 | B2 | * | 5/2012 | Kodama ................ F42B 3/103 280/741 |
| 8,556,294 | B1 | * | 10/2013 | Norman, III .......... B60R 21/264 280/736 |
| 9,994,188 | B1 | * | 6/2018 | Herfert ................ B60R 21/264 |
| 11,904,787 | B1 | * | 2/2024 | Chavez ................ B60R 21/233 |
| 2004/0244632 | A1 | * | 12/2004 | Matsuda ............ B60R 21/2644 102/530 |
| 2018/0326825 | A1 | | 11/2018 | Mankame et al. |
| 2019/0299909 | A1 | | 10/2019 | Alexander et al. |
| 2021/0053692 | A1 | * | 2/2021 | Bahena ................ B64D 25/14 |
| 2021/0071659 | A1 | | 3/2021 | Kim et al. |
| 2021/0071690 | A1 | | 3/2021 | Alexander et al. |
| 2021/0156056 | A1 | | 5/2021 | Alexander et al. |
| 2021/0284347 | A1 | * | 9/2021 | McFarland ............ F01C 21/18 |
| 2023/0091793 | A1 | * | 3/2023 | Shivappa ............ B64D 25/14 244/137.2 |
| 2024/0051262 | A1 | * | 2/2024 | Mankame ................ B32B 1/08 |

\* cited by examiner

INFLATABLE STRUCTURES WITH CHEMICAL REACTION BASED INFLATORS

INTRODUCTION

This section provides background information related to the present disclosure which is not necessarily prior art.

The present disclosure pertains to lightweight, portable, and modular inflatable assemblies that include inflatable structures, such as load-bearing inflatable structures, and chemical reaction based inflator devices for inflation of the inflatable structures.

Inflatable structures may be used in a variety of applications. For example, inflatable structures may be used in applications like temporary inflatable shelters and buildings, military structures, temporary civil engineering structures, e-mobility systems, automated systems, delivery systems, and the like. Inflatable structures may be transported and thus readily deployed in a variety of locations, for example, as emergency or temporary shelters, military installations, or as structures in outer space, by way of non-limiting example.

Inflatable structures offer the benefits of deployability/stowability and low weight. Further, inflatable structures may be load bearing and thus form structural components. Such inflatable structures may contain at least one cavity or chamber that is defined by a flexible material. The cavity may be filled with an inflation fluid, such as a gas or vapor, which may be generated by an inflator. One common type of inflator can be a compressor that generates pressurized air or other gas for filling the cavity in the inflatable structure. However, pressurized inflation equipment may be bulky, heavy, and introduce additional costs for the system. For locations where it may not be possible to have a compressor and electricity or a generator available to fill the inflatable structure, an internal gas generators or pyrotechnic gas generant material can be used in an inflator to generate gas for filling the cavity of the inflatable structure.

Initially, when the cavity in the inflatable structural component is filled with an inflation medium (e.g., gas), it provides a certain level of rigidity and/or structural integrity making it possible to serve as a structural component (e.g., load bearing, shape defining, and the like). However, over time, the inflatable structural component may lose charge or inflation pressure due to diffusion or minor leaks. Thus, inflatable structures often lose structural performance over time and have to be re-inflated in order to maintain their structural integrity, requiring additional systems to be employed to either limit leaks or maintain pressure. However, for certain applications, where a compressor is not available or feasible, this poses particular challenges to maintain an internal inflation pressure. It would be desirable to form portable or mobile robust inflatable structures that are self-contained and can provide the ability to regulate and maintain inflation pressure within the inflatable device for prolonged periods.

SUMMARY

This section provides a general summary of the disclosure, and is not a comprehensive disclosure of its full scope or all of its features.

The present disclosure relates to a lightweight and portable inflatable assembly. In certain aspects, such an inflatable structural component includes a flexible housing defining a cavity. The inflatable structural component has a first operational mode, where the inflatable structural component is uninflated and a second operational mode, where the cavity of the inflatable structural component is filled with an inflation medium. The inflatable structural component is configured to retain the inflation medium in the cavity for greater than or equal to about 4 hours. The lightweight and portable inflatable assembly also includes at least one primary charge unit in fluid communication with the cavity. The at least one primary charge unit includes a first gas generant material configured to generate a first predetermined volume of inflation medium for filling the cavity of the inflatable structural component to transition from the first operational mode to the second operational mode. The lightweight and portable inflatable assembly also includes at least one ancillary charge unit in fluid communication with the cavity and including a second gas generant material configured to generate a second predetermined volume of inflation medium for filling the cavity of the inflatable structural component in the second operational mode. The second predetermined volume is less than or equal to about 40% by volume of the first predetermined volume.

In one aspect, the inflatable structural component includes a primary chamber defining the cavity and a secondary chamber disposed within the primary chamber. The primary chamber is in fluid communication with the at least one primary charge unit. The at least one ancillary charge unit is in fluid communication with the secondary chamber, and the secondary chamber is configured to release inflation medium into the primary chamber.

In one further aspect, the secondary chamber includes a porous barrier material configured to diffuse the inflation medium into the primary chamber or the secondary chamber defines a barrier including one or more vents configured to permit flow of the inflation medium into the primary chamber.

In one further aspect, the porous barrier material includes Nylon.

In one aspect, the flexible housing is a multilayered structure including an outer layer including a high strength textile and an inner layer including a polymeric membrane.

In one further aspect, the high strength textile includes a ripstop Nylon material or an ultra-high molecular weight polyethylene layer laminated between sheets of polyester and the inner layer includes a material selected from the group consisting of: polyimides, thermoplastic polyurethane (TPU), siloxanes including a Nylon reinforcing material, high-temperature resistance fabrics having a siloxane-based coating and a refractory coating, and combinations thereof.

In one aspect, the first gas generant material and the second gas generant material each include sodium azide.

In one aspect, the lightweight and portable inflatable assembly further includes a gas generating unit disposed at one end of the inflatable structure. The gas generating unit is in fluid communication with the cavity and includes the at least one primary charge unit and the at least one ancillary charge unit.

In one further aspect, the gas generating unit includes at least one filter and at least one initiator.

In one aspect, a total mass of the second gas generant material is less than or equal to about 33% of a total mass of the first gas generant material.

The present disclosure also relates to a lightweight, portable, and modular inflatable assembly that includes an inflatable structural component including a flexible housing defining a cavity. The inflatable structural unit has a first operational mode where the inflatable structural component is uninflated and a second operational mode where the cavity of the inflatable structural component is filled with an inflation medium and configured to retain the inflation medium for greater than or equal to about 4 hours. The inflatable assembly also includes at least one primary charge unit in fluid communication with the cavity. The primary charge unit includes a first gas generant material configured to generate a first predetermined volume of inflation medium for filling the cavity of the inflatable structural component to transition from the first operational mode to the second operational mode. The inflatable assembly also includes a plurality of ancillary charge units in fluid communication with the cavity. Each of the ancillary charge units includes a second gas generant material and each is configured to generate a second predetermined volume of inflation medium for filling the cavity of the inflatable structural component in the second operational mode. The second predetermined volume is less than or equal to about 40% of the first predetermined volume.

In one aspect, w the first gas generant material and the second gas generant material each include sodium azide.

In one aspect, the at least one primary charge unit and the plurality of ancillary charge units are contained in a housing having an outlet in fluid communication with the cavity of the inflatable structure.

In one further aspect, the housing further includes at least one filter.

In one aspect, the inflatable structural component is a multilayered structure including an outer layer including a high strength textile and an inner layer including a polymeric membrane including a polymer selected from the group consisting of: polyimide, thermoplastic polyurethane (TPU), copolymers and combinations thereof.

In one aspect, the lightweight, portable, and modular inflatable assembly includes a plurality of primary charge units.

In one aspect, a mass of the second gas generant material is the same in each of the plurality of ancillary charge units.

In one aspect, a mass of the second gas generant material is different in at least two of the plurality of ancillary charge units.

In one aspect, the at least one primary charge unit and the plurality of ancillary charge units each includes an initiator.

The present disclosure also relates to a lightweight and portable inflatable assembly that includes an inflatable structural component including a flexible housing defining a cavity. The inflatable structural component has a first operational mode where the inflatable structural component is uninflated and a second operational mode where the cavity of the inflatable structural component is filled with an inflation medium and configured to retain the inflation medium for greater than or equal to about 4 hours. The lightweight and portable inflatable assembly also includes at least one primary charge unit in fluid communication with the cavity. The at least one primary charge unit includes a first amount of sodium azide configured to generate a first predetermined volume of inflation medium for filling the cavity of the inflatable structural component to transition from the first operational mode to the second operational mode. The lightweight and portable inflatable assembly also includes at least one ancillary charge unit in fluid communication with the cavity. The at least one ancillary charge unit includes a second amount of sodium azide configured to generate a second predetermined volume of inflation medium for filling the cavity of the inflatable structural component in the second operational mode. The second predetermined volume is less than or equal to about 33% by volume of the first predetermined volume.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure relates to lightweight, portable, and modular inflator device assemblies that include inflatable structures, as well as devices for supplying or maintaining an inflation medium, such as a fluid (e.g., gas) to the inflatable structure(s), which may be capable of serving as a load-carrying structure. The term "fluid" as used herein encompasses gas, liquid, and any combinations thereof, including vapor (e.g., a gas phase having aerosolized liquid droplets). In certain aspects, the inflatable structure may be an inflatable structural component, meaning that it can bear or carry an external load (e.g., a vertical column of a building) or serve as a shaping element or boundary delimiter of a space (e.g., a roof truss) for an extended period of time. For example, the inflatable structural component may remain inflated for greater than or equal to about 4 hours, optionally at least about 6 hours, optionally for at least about 12 hours, optionally for at least about 24 hours (1 day), optionally for at least about 48 hours (2 days), in certain aspects, optionally at least about 1 week, and in certain further aspects, optionally at least about one month. In certain variations, the inflatable structural component may be a load-carrying structure that is capable of load bearing and supporting the weight of other components, equipment, and cargo, by way of example. While many different stiffness or deflection values may be permitted based on applicable municipal building codes, in one non-limiting example, an inflatable structural component may be load-bearing and fulfill certain performance requirements, such as not being displaced more than about 155 mm under 3 kN of load being applied to the inflated structural member.

Figure 1:
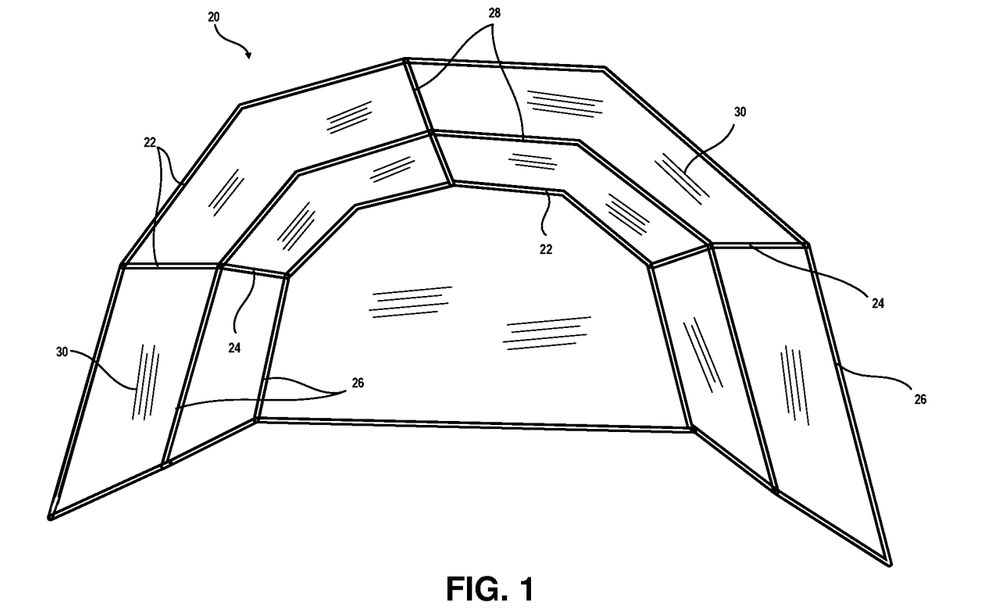
FIG. 1 is a perspective view of an example of an inflatable structural component.

For example, in an example of a load-carrying or load bearing structure 20 in FIG. 1, a plurality of inflatable structural components 22 include horizontal structural beams 24, vertical structural beams 26, and roof trusses 28 that can support a protective barrier material 30 (e.g., housing material, sheeting, tarps, films, cladding, and the like) and any external loads, like cargo, precipitation (e.g., rain, snow, ice), wind, dust, and the like.

Figure 2:
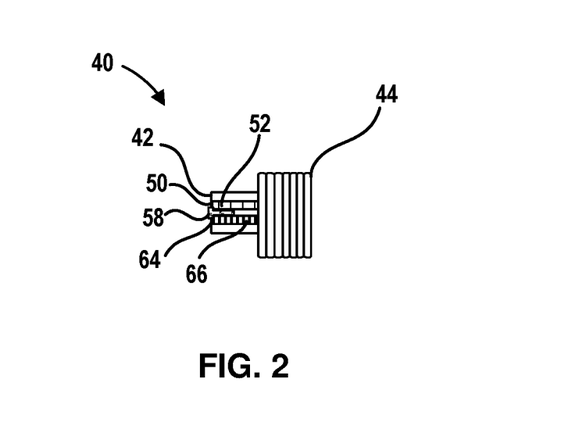
FIG. 2 is a side view of a lightweight and portable inflatable assembly structure according to certain aspects of the present disclosure, when the inflatable structural component is in a first operational mode of a stowed or uninflated state.
Figure 3:
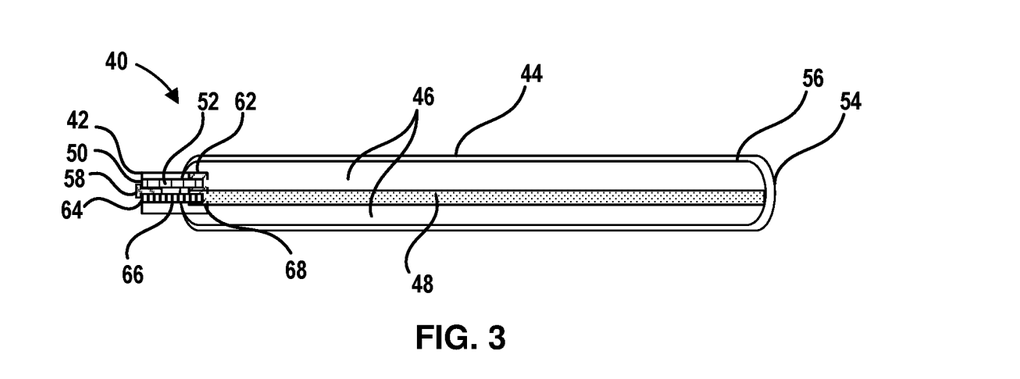
FIG. 3 is a side view of the lightweight and portable inflatable assembly of FIG. 2 when the inflatable structural component is in a second operational mode of a deployed or inflated state.

In certain aspects, the present disclosure contemplates a lightweight and portable inflatable assembly like that shown in FIGS. 2 and 3, which may include a chemical reaction based inflator for an inflatable structural component. FIG. 2 shows an inflator assembly 40 in a first operational mode and FIG. 3 shows the inflator assembly 40 in a second operational mode. The first operational mode is a stowed, compact, and uninflated state, while the second operational mode is a deployed or inflated state. Thus, the inflator assembly 40 may have at least one gas generating module or component 42 and at least one inflatable structural component 44 in fluid communication with one another. The gas generating component 42 may be a chemical reaction based inflator (CRBI)

that includes an internal primary charge unit 50 that includes at least one gas generant or pyrotechnic gas generant material 52. The gas generant material 52 may be in the form or one or more solid grains, tablets, pellets, or the like that can be reacted (e.g., oxidized or undergo another chemical reaction) to generate gas for filling a first cavity or chamber 46 of the inflatable structural component 44.

For example, the gas generant material 52 may be a composition that creates a gas or effluent for inflation as it is reacted (for example, being oxidized or undergoing another chemical reaction) that is directed to the first chamber 46. In various aspects, the gas generant typically includes at least one fuel component, and may include other ingredients, such as oxidizers, ignitors, accelerators and the like, that once triggered, react rapidly to form gaseous reaction products (e.g., $N_2$). While not shown in FIGS. 2 and 3, gas generating component 42 may include a squib or an initiator connected to external wiring. For example, gas generants may be directly ignited by a squib (in a single stage) or may be used with a squib and initiator material that is electrically ignited (in a two-stage triggering mechanism) when the inflation gas is needed. In FIGS. 2 and 3, an initiator 58 is shown (which may have additional external electrical connectors, not shown). When activated, the discharge from the squib/initiator can trigger the gas generant directly or trigger an igniter material that burns rapidly and exothermically that then ignites the gas generant material. The effluent from the gas generant material 52 causes the inflator assembly 40 to transition from the first operational mode (FIG. 2) to the second operation mode (FIG. 3) by filling the inflatable structural component 44 with an inflation medium.

In certain variations, the composition of the gas generant material 52 is selected to deliver a desired volume of effluent in a predetermined amount of time to fill the inflatable structural component 44. In certain variations, the gas generant material 52 may comprise sodium azide ($NaN_3$), which when ignited generates nitrogen gas ($N_2$). The amount of gas generant material 52 may depend on the volume of inflation fluid required to fill and pressurize a volume of the first chamber 46 of the inflatable structural component 44 to the desired pressure. For example, sodium azide typically produces about 3 liters (L) of inflation fluid (e.g., $N_2$ gas) per 1 gram (g) of material. Thus, by way of example, where a volume to be inflated is about 60-70 L, the gas generant material 52 may be contain about 20 g to 23 g of sodium azide.

The inflatable structural component 44 is not limited to the geometry or dimensions shown, although in certain variations, the inflatable structural component 44 may be an elongated cylindrical shape that can form an elongated structural beam. The inflatable structural component 44 may be formed of a flexible housing that comprises a flexible material, such as a fabric, plastic, or the like, that in a first position/operational mode is stowed or folded in a compact configuration and in a second position/operational mode is deployed and extends outwards and defines the first chamber 46. By flexible, it is meant that the material can bend without damage or breakage.

As shown, the inflatable structural component 44 may be a multilayer structure that includes an outer structural layer 54 and an inner confinement layer 56. The outer structural layer 54 may serve several roles, such as to protect the inner confinement layer 56 from physical damage, such as cuts, scratches, wear, and the like, and/or to define the shape of the inflatable structural component 44 after it is fully inflated. The outer structural layer 54 may be made formed of a high strength textile, such as a tent fabric or a sail material. One example of a suitable tent fabric is a ripstop Nylon material, which is formed with a reinforcing technique that minimizes or prevents propagation of rips through the material. The ripstop Nylon may have a water repellant coating, such as 20D (denier) by 330T (thread count) ripstop Nylon 1200 mm that may have a water repellent coating like a Durashield™ polyurethane and silicone water-repellant coating. In another example, the high strength textile may be a sail material, such as a high-performance non-woven composite material like an ultra-high molecular weight polyethylene layer laminated between two sheets of polyester, commercially available as a Dyneema Composite Fabric (DCF) or Cuben Fiber (CTF3).

The inner confinement layer 56 may serve to augment a stiffness of the inflatable structural component. Further, the inner confinement layer 56 preferably is formed from a material or has a coating on the inside of this layer that offers significant resistance to diffusion/permeation of the gas charge through the layer 56. The inner confinement layer 56 may be formed of a material selected from the group consisting of: polyimides, thermoplastic polyurethane (TPU), siloxanes comprising a Nylon reinforcing material (e.g., fibers, mats, and the like), high-temperature resistance fabrics (e.g., having a siloxane-based coating and a refractory coating), and combinations thereof. In certain aspects, the inner confinement layer 56 may be formed from a polymeric material, such as a polyimide like KAPTON™, thermoplastic polyurethane (TPU), siloxanes integrated with a Nylon 6,6 reinforcing fiber mat, or high-temperature resistance fabrics, like a fabric having a silicone (siloxane-based) coating and a refractory coating, such as commercially available ARMATEX® coated fabrics, or copolymers, derivatives, or combinations/blends thereof. Notably, the inflatable structural component 44 may be formed of more than two layers and is not limited to the configuration shown. In certain variations, additional layers may be included to provide a desired level of impermeability to the inflation medium/gas contained with the cavity defined by the flexible housing.

The first chamber 46 defines a cavity filled with a predetermined volume of gas generated by the primary charge unit 50 of the gas generating component 42. In this manner, the inflatable structural component 44 in the second operational mode provides walls with a rigidity and/or structural integrity that makes the inflator assembly 40 capable of serving as a load bearing or structural component for other materials. The effluent fluids generated by the gas generant material 52 may pass through an optional filter 62 that then enter the first chamber 46 of the inflatable structural component 44.

In accordance with certain aspects of the present disclosure, the gas generating component 42 also includes the ancillary charge unit 64 that includes at least one supplemental gas generant or pyrotechnic gas generant material 66 that is also a chemical reaction based inflator (CRBI) for providing a make-up charge (supplemental volume of inflation medium/gas) to first chamber 46 of the inflatable structural component 44. The effluent fluids generated by the supplemental gas generant material 66 may pass through an optional filter 68 that then enters the inflatable structural component 44. The make-up charge is transferred into the first chamber 46 after the transition to the second operational mode, as will be described further below.

In certain aspects, the ancillary charge unit 64 may provide direct inflation into the first chamber 46, where efflux from the ancillary charge unit 64 directly contributes to the main pressurized chamber of the inflatable structure.

In other aspects, like the variation shown in FIGS. 2 and 3, the supplemental inflation occurs in a staged configuration. The efflux from the inflator fills a secondary pressurized chamber 48, which then feeds into the main pressurized chamber/first chamber 46 of the inflatable structure. This buffering can help to mitigate any timing mismatch between the chemical reaction rate and the needed make-up/refill rate.

Thus, the ancillary charge unit 64 may be in direct fluid communication with a secondary cavity or chamber 48 that is disposed within the first chamber 46. The fluid in the secondary chamber 48 may migrate through the wall for example, by diffusion through a porous material, through one or more internal valves, and the like, to enter into the main pressurized chamber or first chamber 46. The rate of transfer or migration of make-up charge can be controlled passively (for example, by selecting a material for the secondary chamber 48 wall with a desired diffusion coefficient for the fluid related to its porosity) or actively (for example, by selecting internal valve settings that open the valves at a set point to facilitate the desired flow rate). The make-up charge in the secondary chamber 48 may thus diffuse or transfer into the first chamber 46. In other variations not shown, the ancillary charge unit 64 may directly fill the first chamber 46 with make-up charge/gas.

Thus, the primary charge unit 50 is activated to fill the first chamber 46 of the inflatable structural component 44 with the predetermined volume of gas, so that the inflatable structural component 44 transitions from the first operational mode to the second operational mode. Thus, the inflator assembly 40 transitions from a stowed compact non-use configuration to an active deployed configuration where the inflator assembly 40 is used as a load-bearing structural element. However, as noted above, the inflatable structural component 44 of the inflator assembly 40 may lose charge or inflation pressure due to minor leaks over time. The ancillary charge unit 64 thus supplements the lost volume of gas from the inflatable structural component 44 by providing make-up charge gas and thus prolongs a service life of the inflator assembly 40. This can be achieved by filling the second chamber 48 so that the make-up charge gas diffuses slowly into the first chamber 46, as shown in FIG. 3 or directly filling the first chamber 46. The secondary chamber 48 may be formed of a flexible material that may be stowed in the first operational mode, but may be porous and/or have vents that permit a predetermined rate of diffusion or gas transfer into the first chamber 46 in the second operational mode. Suitable examples of a porous barrier material for the secondary chamber 48 include woven Nylon 6,6 fabrics, which may further have an optional lining or coating to control permeability rates of the gas through the fabric.

In certain variations, the composition of the supplemental gas generant material 66 in the ancillary charge unit 64 that provides make-up charge to the inflatable structural component 44 may be the same chemical composition (or alternatively different) as the gas generant material 52, but is selected to deliver a desired volume of make-up effluent in a predetermined amount of time to help refill inflatable structural component 44 to account for lost inflation medium. For example, in certain aspects, the supplemental gas generant material 66 in the ancillary charge unit 64 may be selected to be different than the main gas generant material 52 to provide better stability over time to be ready for use at an undetermined future time, as compared to the objective of generating large volumes of inflation medium relatively quickly for the primary gas generating component 42 during initial inflation. While not shown in the figures, the ancillary charge unit 64 and supplemental gas generant material 66 may include a squib or initiator material connected to the initiator 58 or the initiator 58 may directly initiate the reaction of the gas generant and generate inflation fluid. As will be appreciated by those of skill in the art, lightweight and portable inflatable assemblies may include not only the chemical charge that produces inflation medium/gas, but also the means to trigger the gas generating reaction (e.g., electrical ignition), filters to keep non-gaseous by-products of the reaction from entering into the inflatable chambers, as well as valving to control the flow of the inflation medium/gas, and electronics to sense and control the reaction.

The ancillary charge unit 64 may be activated in a variety of different ways, including automatically or manually by a user. For example, in certain aspects, the ancillary charge unit 64 may be activated by monitoring and measuring a pressure level in one or more locations in the inflatable structural component 44 or when a predetermined amount of time has passed, for example, by estimating a rate of leakage from the first chamber 46 of the inflatable structural component 44 and determining when additional make-up inflation medium will be needed to supplement the initial amount of inflation medium. Another way for activating the ancillary charge unit 64 is to measure one or more aspects of the mechanical response of the overall structure, for example, if a floor or a roof sags by more than a predetermined amount.

In certain applications, the internal pressure within the first chamber 46 may be targeted to be at least about 10 kPa and may be as high as about 345 kPa, for example, an internal pressure may be greater than or equal to about 30 kPa to less than or equal to about 100 kPa, so that if the pressure level falls below this amount, the ancillary charge unit 64 may be activated to generate make-up gas. In certain variations, the inflatable structural component 44 may be required to withstand certain physical conditions, which may be measured and/or monitored.

For example, in certain applications, the inflatable device is required to have certain levels of stiffness, such as having greater than or equal to about 0.1 N/mm to about 25 N/mm of stiffness for the inflatable structure. For example, if the nominal stiffness is about 1 N/mm for the inflatable structural component, then it would deflect by 100 mm for 100 N of load being applied to the structural member.

Thus, the inflatable device may have a target internal pressure, such as one of the pressures discussed above, and/or a target stiffness level like those described above. If the inflatable structural component fails to achieve this performance goal when tested, the ancillary charge unit may be activated. As will be appreciated by those of skill in the art, the pressure thresholds that trigger re-pressurization will vary from application to application, and from one structural member to another within an application. By way of non-limiting example, a roof truss for an inflatable structure may be designed to have an internal pressure of about 30 kPa. It may be acceptable for pressure to drop so low as 10 kPa, if a peak load on the beam never exceeds 10N. However, the inflatable structural component would need to be re-pressurized before the internal pressure drops below 20 kPa, for example, if it is subjected to loads between 10-25N, else it could experience a loss of stiffness for a load of around 25N, which should advantageously be avoided. In other variations, the structural member could withstand a certain amount of displacement (e.g., having a certain amount of sagging in one or more directions), for example, sagging or being displaced in at least one direction from an initial position by about 10 mm or more may serve to trigger activation of the ancillary charge unit to generate make-up inflation medium.

In certain variations, the supplemental gas generant material 66 may comprise sodium azide ($NaN_3$) that generates nitrogen gas ($N_2$) upon activation. The amount of supplemental inflation gas generated by the gas generant material 66 will depend on the predetermined volume of inflation fluid required to fill a volume of the first chamber 46 of the inflatable structural component 44. For example, the predetermined volume of make-up charge to be generated by the supplemental gas generant material 66 may be less than or equal to about 40% of the total volume of the first chamber 46, optionally less than or equal to about 33% of the total volume of the first chamber 46, optionally less than or equal to about 25% of the total volume of the first chamber 46, optionally less than or equal to about 20% of the total volume of the first chamber 46, optionally less than or equal to about 15% of the total volume of the first chamber 46, and in certain variations, optionally less than or equal to about 10% of the total volume of the first chamber 46. Thus, if a predetermined volume of the first chamber 46 is about 60 L (generated by about 20 g of sodium azide as the gas generant material 52), then in one example where the make-up charge (e.g., for filling the secondary chamber 48) is about ⅓ of the volume of the first chamber 46, this would be about 20 L of inflation medium that would be provided by about 6-7 g of sodium azide in the supplemental gas generant material 66.

Similarly, the supplemental gas generant material 66 may have a total mass (whether as a single solid grain, pellet, or tablet or as a plurality of grains, pellets or tablets) that is less than or equal to about 40% of the total mass of the first gas generant material 52, optionally less than or equal to about 33% of the total mass of the gas generant material 52, optionally less than or equal to about 25% of the total mass of the gas generant material 52, optionally less than or equal to about 20% of the total mass of the gas generant material 52, optionally less than or equal to about 15% of the total mass of the gas generant material 52, and in certain variations, optionally less than or equal to about 10% of the total mass of the gas generant material 52. Thus, if a total mass of the gas generant material 52 is about 20 g of sodium azide, then in one example where the supplemental gas generant material 66 is about ⅓ of the mass, the supplemental gas generant material 66 would be about 6-7 g of sodium azide.

It should be noted that while not shown, the inflator assembly 40 may have different configurations, including more than one gas generating components 42 in different locations in fluid communication with the inflatable structural component 44, or the internal primary charge unit 50 being disposed in a different location than the ancillary charge unit 64, or multiple ancillary charge units 64 disposed in different locations than the internal primary charge unit 50 with respect to the inflatable structural component 44. Additionally, as noted above, the inflator assembly 40 may have additional components, including squibs, ignition or initiator materials, additional chemicals for reaction, connectors, electrical wiring, gaskets, seals, valves, monitors (e.g., pressure and temperature monitors), and the like.

One alternative embodiment involves the use of a progressive valve to control the efflux from the secondary chamber 48 to the primary first chamber 46. This can allow the use of a single gas generant in the secondary chamber 48 to provide both—the primary first chamber 46 pressurization, as well as the make-up inflation fluid/re-pressurization as needed.

In this manner, the inflator assembly 40 is a portable or mobile robust inflatable structural component that is self-contained and can provide the ability to regulate and maintain inflation pressure within the inflatable device for prolonged periods of time. Using these inflatable assemblies, including inflator devices used in conjunction with compatible inflatable structures, mitigates the need for inflation systems that are heavy, bulky, and expensive.

In certain variations, the inflatable device may be disposed between and attached to two planar structures, such as two plates. In such a configuration, in the second operational mode when the inflatable structural component is filled in the inflator device, the plates are spaced apart from one another. The chemical reaction based lightweight, portable, and modular inflatable assemblies provided by the present disclosure may be used in a variety of different applications, by way of non-limiting example, the inflatable structures may be transported and thus readily deployed in a variety of locations, for example, as emergency or temporary shelters (e.g., housing), parking lots, recreational structures, military installations (e.g., buildings, pontoons), civil infrastructure (e.g., bridges), e-mobility and robotic structures, or as structures in outer space, by way of non-limiting example.

Figure 4:
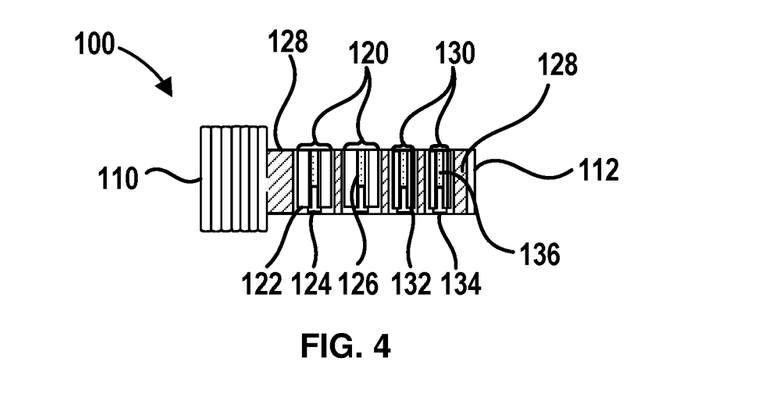
FIG. 4 is a side view of a lightweight, portable, and modular inflatable assembly according to certain aspects of the present disclosure, when the inflatable structural component is in a first operational mode of a stowed or uninflated state.

The present disclosure also contemplates lightweight, portable, and modular inflatable assemblies that may include an inflatable structural component and a chemical reaction based inflator device. FIG. 4 shows an example of a modular inflator device assembly 100 that has a bank of inflators assembled together. The modular inflator device assembly 100 includes an inflatable structural component 110, which may optionally serve as a load-bearing structural component. FIG. 4 shows the inflator device assembly 100 in a first operational mode where the inflatable structural component 110 is stowed, compact, and in an uninflated state. The inflatable structural component 110 may be inflated to a second operational mode similar to that shown in FIG. 3 for inflator device 40, but not shown here. The inflator device assembly 100 includes an encasement or housing 112 that is in fluid communication with the inflatable structural component 110. One or more primary gas generating components 120 are included in the housing 112. These primary gas generating components 120 may include a primary gas generant material 122 like the pyrotechnic gas generant material 52 described above in the context of FIGS. 2 and 3. Notably, to the extent that the features, properties, and operational principles of the inflator device 40 are common to the modular inflator device assembly 100, for brevity, they will not be repeated herein. The primary gas generating components also include an ignitor 124 and an optional ignition material 126. One or more optional filters 128 are provided in the housing 112 for filtering effluent gases, including those generated by the primary gas generating components 120.

One or more ancillary charge units 130 are also included in the housing 112 to provide supplemental or make-up charge to the inflatable structural component 110, as necessary. The ancillary charge units 130 may each include supplemental gas generant 132 like the supplemental gas generant material 66 described above in the context of FIGS. 2 and 3. The ancillary charge units 130 may also include an ignitor 134 and an optional ignition material 136. The make-up charge effluent generated by the supplemental gas generants 132 may pass through filters 128 within the housing 112 and then into the inflatable structural component 110.

The modular inflator device assembly 100 having the plurality of primary gas generating components 120 and plurality of ancillary charge units 130 provides flexibility in the use and design of the inflator device. As shown, the plurality of primary gas generating components 120 and plurality of ancillary charge units 130 share an outer membrane or housing 112, but each may alternatively have a separate housing that is in fluid communication with the inflatable structural component 110.

As appreciated by those of skill in the art, the primary gas generating components 120 may instead be a single component or three or more components 120. Likewise, the ancillary charge units 130 may be a single component of three or more units/components. The individual units, whether primary gas generating components 120 or ancillary charge units 130, may be individually monitored in situ for health and replaced if they appear to have lost charge/viability or are defective. Further, depending on how many primary gas generating components 120 are activated at one time and/or how many ancillary charge units 130 are activated at one time can help to control an inflation speed, for example, ranging from inflating the inflatable structural component 110 in a nearly instantaneous manner on the order of a few millisecond (e.g., about 3-10 ms) to a lower rate which may inflate the inflatable structural component in a timeframe of a period of hours to days (e.g., 1 hour, 6 hours, 12 hours, 24 hours (1 day), 48 hours (2 days), and the like). Further, the ability to include multiple ancillary charge units 130 can extend the longevity of the modular inflator device assembly 100, by providing the ability to boost a volume of the inflation medium in the inflatable structural component to maintain inflation pressure by successively firing individual ancillary charge units 130 over a longer duration of time.

In this manner, the bank of inflator units in the modular inflator device assembly 100 provides flexibility and adaptability in the use of the inflator device. It includes redundancy for possible failure of a primary unit. Further, each primary gas generating component 120 (and/or ancillary charge unit 130) may share a common size to provide the ability for multiple deploying events and potential reuse. In other variations, primary gas generating components 120 and/or ancillary charge units 130 may have a different size to provide the ability for a primary deploying event followed by regular successive make-up/refill events.

As will be appreciated, the modular inflator device assembly 100 may have additional components not shown, including additional chemicals for reaction, connectors, electrical wiring, gaskets, seals, valves, monitors (e.g., pressure and temperature monitors), and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lightweight and portable inflatable assembly comprising:
    an inflatable structural component comprising a flexible housing defining a cavity and having a first operational mode where the inflatable structural component is uninflated and a second operational mode where the cavity of the inflatable structural component is filled with an inflation medium and configured to retain the inflation medium for greater than or equal to about 4 hours;
    at least one primary charge unit in fluid communication with the cavity and comprising a first gas generant material configured to generate a first predetermined volume of inflation medium for filling the cavity of the inflatable structural component to transition from the first operational mode to the second operational mode; and
    at least one ancillary charge unit in fluid communication with the cavity and comprising a second gas generant material configured to generate a second predetermined volume of inflation medium for filling the cavity of the inflatable structural component in the second operational mode, wherein the second predetermined volume is less than or equal to about 40% by volume of the first predetermined volume.

2. The lightweight and portable inflatable assembly of claim 1, wherein the inflatable structural component comprises a primary chamber defining the cavity and a secondary chamber disposed within the primary chamber, wherein the primary chamber is in fluid communication with the at least one primary charge unit, the at least one ancillary charge unit is in fluid communication with the secondary chamber, and the secondary chamber is configured to release inflation medium into the primary chamber.

3. The lightweight and portable inflatable assembly of claim 2, wherein the secondary chamber comprises a porous barrier material configured to diffuse the inflation medium into the primary chamber or defines a barrier comprising one or more vents configured to permit flow of the inflation medium into the primary chamber.

4. The lightweight and portable inflatable assembly of claim 3, wherein the porous barrier material comprises Nylon.

5. The lightweight and portable inflatable assembly of claim 1, wherein the flexible housing is a multilayered structure comprising an outer layer comprising a high strength textile and an inner layer comprising a polymeric membrane.

6. The lightweight and portable inflatable assembly of claim 5, wherein the high strength textile comprises a ripstop Nylon material or an ultra-high molecular weight polyethylene layer laminated between sheets of polyester and the inner layer comprises a material selected from the group consisting of: polyimides, thermoplastic polyurethane (TPU), siloxanes comprising a Nylon reinforcing material, high-temperature resistance fabrics having a siloxane-based coating and a refractory coating, and combinations thereof.

7. The lightweight and portable inflatable assembly of claim 1, wherein the first gas generant material and the second gas generant material each comprise sodium azide.

8. The lightweight and portable inflatable assembly of claim 1, further comprising a gas generating unit disposed at one end of the inflatable structural component, wherein the gas generating unit is in fluid communication with the cavity and comprises the at least one primary charge unit and the at least one ancillary charge unit.

9. The lightweight and portable inflatable assembly of claim 8, where the gas generating unit comprises at least one filter and at least one initiator.

10. The lightweight and portable inflatable assembly of claim 1, wherein a total mass of the second gas generant material is less than or equal to about 33% of a total mass of the first gas generant material.

11. A lightweight, portable, and modular inflatable assembly comprising:
- an inflatable structural component comprising a flexible housing defining a cavity and having a first operational mode where the inflatable structural component is uninflated and a second operational mode where the cavity of the inflatable structural component is filled with an inflation medium and configured to retain the inflation medium for greater than or equal to about 4 hours;
- at least one primary charge unit in fluid communication with the cavity and comprising a first gas generant material configured to generate a first predetermined volume of inflation medium for filling the cavity of the inflatable structural component to transition from the first operational mode to the second operational mode; and
- a plurality of ancillary charge units in fluid communication with the cavity and each comprising a second gas generant material and each configured to generate a second predetermined volume of inflation medium for filling the cavity of the inflatable structural component in the second operational mode, wherein the second predetermined volume is less than or equal to about 40% of the first predetermined volume.

12. The lightweight, portable, and modular inflatable assembly of claim 11, wherein the first gas generant material and the second gas generant material each comprise sodium azide.

13. The lightweight, portable, and modular inflatable assembly of claim 11, wherein the at least one primary charge unit and the plurality of ancillary charge units are contained in a housing having an outlet in fluid communication with the cavity of inflatable structural component.

14. The lightweight, portable, and modular inflatable assembly of claim 13, wherein the housing further comprises at least one filter.

15. The lightweight, portable, and modular inflatable assembly of claim 11, wherein the inflatable structural component is a multilayered structure comprising an outer layer comprising a high strength textile and an inner layer comprising a polymeric membrane comprising a polymer selected from the group consisting of: polyimide, thermoplastic polyurethane (TPU), copolymers and combinations thereof.

16. The lightweight, portable, and modular inflatable assembly of claim 11 comprising a plurality of primary charge units.

17. The lightweight, portable, and modular inflatable assembly of claim 11, wherein a mass of the second gas generant material is the same in each of the plurality of ancillary charge units.

18. The lightweight, portable, and modular inflatable assembly of claim 11, wherein a mass of the second gas generant material is different in at least two of the plurality of ancillary charge units.

19. The lightweight, portable, and modular inflatable assembly of claim 11, wherein the at least one primary charge unit and the plurality of ancillary charge units each comprises an initiator.

20. A lightweight and portable inflatable assembly comprising:
- an inflatable structural component comprising a flexible housing defining a cavity and having a first operational mode where the inflatable structural component is uninflated and a second operational mode where the cavity of the inflatable structural component is filled with an inflation medium and configured to retain the inflation medium for greater than or equal to about 4 hours;
- at least one primary charge unit in fluid communication with the cavity and comprising a first amount of sodium azide configured to generate a first predetermined volume of inflation medium for filling the cavity of the inflatable structural component to transition from the first operational mode to the second operational mode; and
- at least one ancillary charge unit in fluid communication with the cavity and comprising a second amount of sodium azide configured to generate a second predetermined volume of inflation medium for filling the cavity of the inflatable structural component in the second operational mode, wherein the second predetermined volume is less than or equal to about 33% by volume of the first predetermined volume.

* * * * *